(12) United States Patent
Secor

(10) Patent No.: US 10,786,840 B1
(45) Date of Patent: Sep. 29, 2020

(54) AIRFLOW CAPTURE HOOD SYSTEM

(71) Applicant: Evergreen Telemetry LLC, Tempe, AZ (US)

(72) Inventor: Russell Peter Secor, Tempe, AZ (US)

(73) Assignee: Evergreen Telemetry LLC, Phoenix, AZ (US)

( * ) Notice: Subject to any disclaimer, the term of this patent is extended or adjusted under 35 U.S.C. 154(b) by 218 days.

(21) Appl. No.: 15/712,004

(22) Filed: Sep. 21, 2017

(51) Int. Cl.
| | | |
|---|---|---|
| *B08B 15/02* | (2006.01) | |
| *G01F 1/34* | (2006.01) | |
| *F24F 11/00* | (2018.01) | |
| *F24F 11/72* | (2018.01) | |
| *F24F 11/30* | (2018.01) | |
| *F24F 13/10* | (2006.01) | |
| *F24F 13/06* | (2006.01) | |
| *G01F 1/40* | (2006.01) | |
| *F24F 13/02* | (2006.01) | |
| *F24F 11/74* | (2018.01) | |
| *G01P 5/00* | (2006.01) | |
| *F24F 110/30* | (2018.01) | |
| *F24F 110/00* | (2018.01) | |

(52) U.S. Cl.
CPC .......... *B08B 15/02* (2013.01); *F24F 11/0001* (2013.01); *F24F 11/30* (2018.01); *F24F 11/72* (2018.01); *G01F 1/34* (2013.01); *F24F 2110/00* (2018.01); *F24F 2110/30* (2018.01); *G05B 2219/24084* (2013.01)

(58) Field of Classification Search
CPC ...... F24F 13/105; F24F 13/06; F24F 13/0218; G01F 1/40

USPC ..... 454/56, 49, 66, 292, 297, 310, 311, 317, 454/903; 138/118
See application file for complete search history.

(56) References Cited

U.S. PATENT DOCUMENTS

| | | | | |
|---|---|---|---|---|
| 4,231,253 A | * | 11/1980 | Ohnhaus | G01F 1/40 73/861.62 |
| 4,481,829 A | * | 11/1984 | Shortridge | G01F 1/46 73/861.66 |
| 4,548,076 A | * | 10/1985 | Haake | G01F 7/00 73/202 |

(Continued)

FOREIGN PATENT DOCUMENTS

JP            S6113112 A   *  1/1986   .............. F03B 3/103

OTHER PUBLICATIONS

Holyoake Air Management Solutions. "CSS Slotted Pattern Swirl Diffusers". http://www.holyoake.com/product-details/CSS_item.html?ref_cat_id=Swirl-Diffusers. Feb. 2014 (per Internet Archive WaybackMachine—https://archive.org/).*

(Continued)

*Primary Examiner* — Edelmira Bosques
*Assistant Examiner* — Christopher Matthew Odell
(74) *Attorney, Agent, or Firm* — Adam R. Stephenson, LTD.

(57) ABSTRACT

Implementations of an airflow capture hood plate may include a plate including a plurality of openings therethrough. The plate may be configured to couple to a hood to guide airflow through the hood when the hood is placed over a diffuser of a heating, ventilation and air conditioning (HVAC) system and the plurality of openings in the plate may be configured to align with a plurality of ribs of a grid in the hood.

10 Claims, 6 Drawing Sheets

(56) References Cited

U.S. PATENT DOCUMENTS

| | | | | |
|---|---|---|---|---|
| 4,715,234 A | * | 12/1987 | Allen | G01F 1/10 |
| | | | | 384/471 |
| 8,578,790 B2 | | 11/2013 | Secor | |
| 8,757,008 B1 | * | 6/2014 | Nelson | G01F 1/44 |
| | | | | 73/861 |
| 9,074,917 B2 | | 7/2015 | Secor | |
| 9,453,746 B2 | * | 9/2016 | Brugger | G01F 1/05 |
| 9,605,857 B2 | | 3/2017 | Secor | |
| 2007/0178823 A1 | * | 8/2007 | Aronstam | F24F 3/00 |
| | | | | 454/256 |

OTHER PUBLICATIONS

"Machine Translation for JPS6113112A". 2020.*
Photo of a Shortridge Instruments airflow capture hood, retrieved on Sep. 20, 2017 and available at http://www.shortridge.com/.
Photo of a TSI/Alnor capture hood, retrieved on Sep. 20, 2017 and available at http://www.tsi.com/alnor-balometer-capture-hood-ebt731/.
Photo of an Evergreen Telemetry hood, retrieved on Sep. 20, 2017 and available at http://evergreentelemetry.com/Capture_Hood.html.
Screen shots from a youtube video by HVAC Learning Solutions, retrieved on Sep. 15, 2017 and available at https://www.youtube.com/watch?v=KC97kZc6w6A.

* cited by examiner

AIRFLOW CAPTURE HOOD SYSTEM

BACKGROUND

1. Technical Field

Aspects of this document relate generally to devices used to measure environmental parameters such as airflow. More specific implementations involve airflow capture hood flow control systems.

2. Background

Conventionally, heating, ventilation, and air conditioning (HVAC) systems are tested, balanced and adjusted using a number of different instruments, including airflow capture hoods. Airflow capture hoods may measure air volume flow from vents, diffusers and grilles by funneling air from the vent, diffuser or grille through a grid at a base of the airflow capture hood. The airflow capture hoods may be used with a wide variety of diffusers including diffusers as small as a 6" by 6" diffuser in a bathroom to diffusers as large as a 2' by 4' supply air diffuser used in a hospital. The variety of diffuser sizes also handle varying amounts of air. The bathroom diffuser may pass as little as 15 cubic feet per minute (CFM) while the hospital diffuser may pass as much as 2000 CFM. The grid includes a framework of branches which help derive an airflow measurement as the branches are in the stream of airflow.

SUMMARY

Implementations of an airflow capture hood plate may include a plate including a plurality of openings therethrough. The plate may be configured to couple to a hood to restrict airflow through the hood when the hood is placed over a diffuser of a heating, ventilation and air conditioning (HVAC) system and the plurality of openings in the plate may be configured to align with a plurality of ribs of a grid in the hood.

Implementations of an airflow capture hood plate may include one, all, or any of the following:

The openings of the plate may include a spoked pattern.

The openings of the plate may include a branched spoked pattern.

The surface area of the openings may be less than 0.5 square feet.

The surface area of the openings may be less than 1.3 square feet.

The plate may be at least 16 inches in diameter.

The plate may be configured to couple to the hood at a center of the hood.

The plate may be configured to couple to the hood at a side of the grid opposite a side of the grid facing the diffuser.

Implementations of an airflow capture hood system may include a hood including a grid and a plate coupled to the hood and aligned with the grid, the plate including a plurality of openings configured to expose the grid to airflow through the hood when the hood is placed over the diffuser of an HVAC system. The plate may be coupled to the hood at a side of the grid opposite a side of the grid facing the diffuser.

Implementations of an airflow capture hood system may include one, all, or any of the following:

The grid may include a spoked pattern.

The grid may include a branched spoked pattern.

The plate may be configured to decrease an area that airflow exits the hood by at least 25%.

The plate may be configured to decrease an area that airflow exits the hood by at least 50%.

The hood may include a central hub and the plate may be configured to fit over the central hub.

Implementations of an airflow capture hood system may include a hood including a grid and a plate coupled to the hood and aligned with the grid, the plate including a plurality of openings therethrough. The plurality of openings may be sized to allow a measurement of a predetermined range of airflow to flow through the openings when the hood is placed over a diffuser of an HVAC system.

Implementations of an airflow capture hood system may include one, all, or any of the following:

The measurement may be 70-700 cubic feet per minute.

The measurement may be 30-200 cubic feet per minute.

The grid may include a spoked pattern.

The grid may include a branched spoked pattern.

An outer perimeter of the plate may be one of a circle, a rectangle, and a rounded rectangle.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure and its aspects and implementations are not limited to the specific components, assembly procedures or method elements disclosed herein. Many additional components, assembly procedures and/or method elements known in the art consistent with the intended airflow capture hood flow control systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such airflow capture hood flow control systems, and implementing components and methods, consistent with the intended operation and methods.

Figure 1:
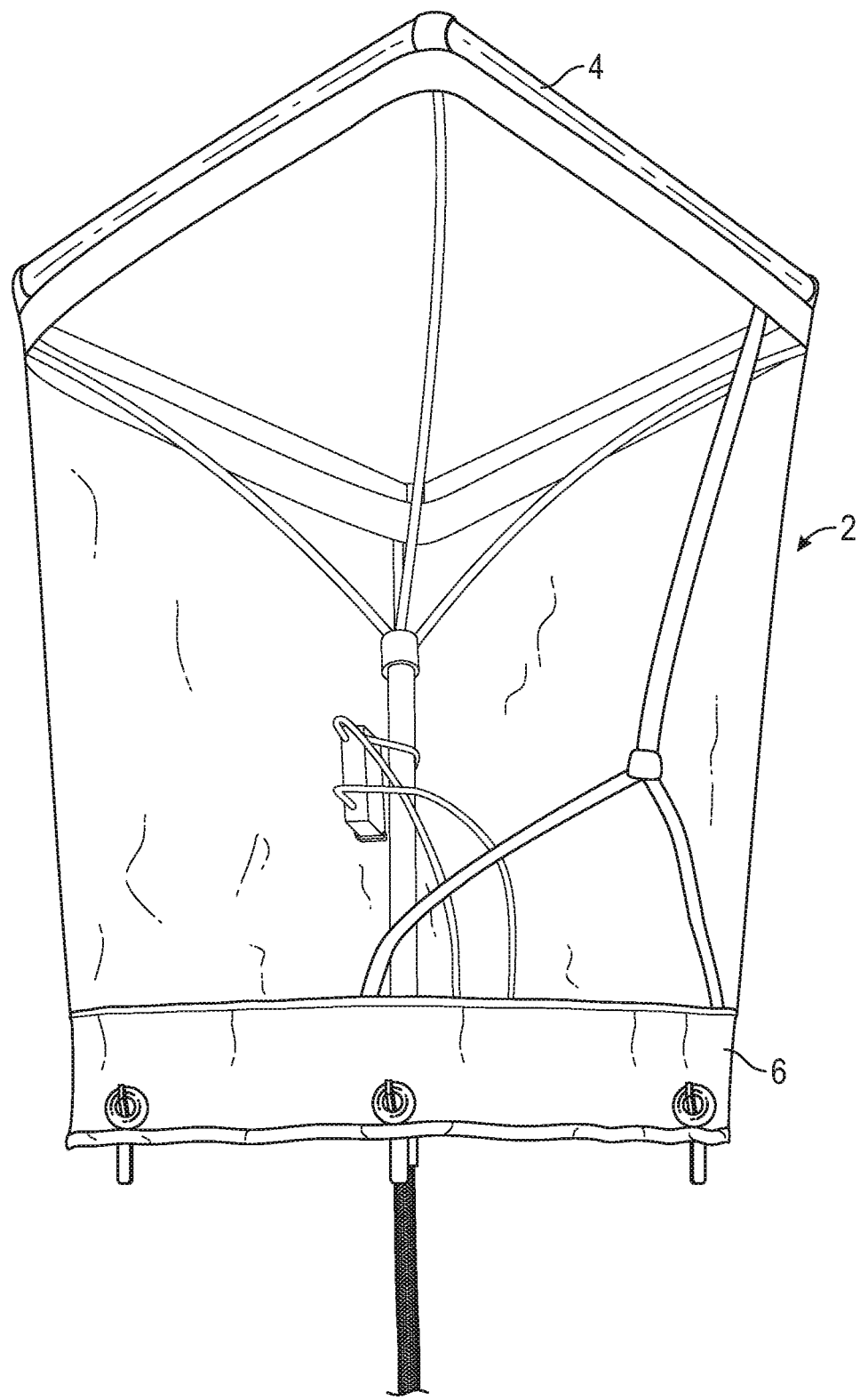
FIG. 1 is a side perspective view of an airflow capture hood.

Referring to FIG. 1, a side perspective view of an airflow capture hood is illustrated. The airflow capture hood flow control systems disclosed herein utilize an airflow capture hood 2 (hereinafter "hood") to test, adjust, and balance airflow exiting or entering a diffuser in a heating, ventilation, and air conditioning (HVAC) system. A top portion 4 of the hood 2 is placed around a diffuser. Airflow is channeled through the hood and passes through a grid at a bottom portion 6 of the hood 2. Various hoods and other related components disclosed herein may be used in conjunction with the airflow capture hood flow control systems, including the implementations of hoods and or related methods disclosed in the following: U.S. patent application Ser. No. 15/711,986, to Russell Peter Secor entitled "Airflow Capture Hood," filed on Sep. 21, 2017; U.S. Pat. No. 9,605,857 to Russell Peter Secor, entitled "Wireless sensors system and method of using same," filed Aug. 11, 2011 and issued Mar. 28, 2017; U.S. Pat. No. 8,578,790 to Russell Peter Secor, entitled "Apparatus for Measurement of Ducted Air," issued Nov. 12, 2013; and U.S. Pat. No. 9,074,917 to Russell Peter Secor, entitled "Apparatus for Measurement of Ducted Air," issued Jul. 7, 2015, the disclosures of each of which are hereby incorporated entirely herein by reference. In various implementations, different hood designs from the hood design illustrated in FIG. 1 may be used in conjunction with the implementations of airflow capture hood flow control systems disclosed in this document. Such hoods may have a rigid or pliable skirt. The hoods may also include a rigid bottom portion, or base, used to support the remainder of the hood. The hoods may be any size and may have varying shapes. Specifically, the bottom portion 6 of the hood may have a perimeter the shape of a circle, rectangle, rounded rectangle, or any other closed perimeter geometrical shape.

Figure 2:
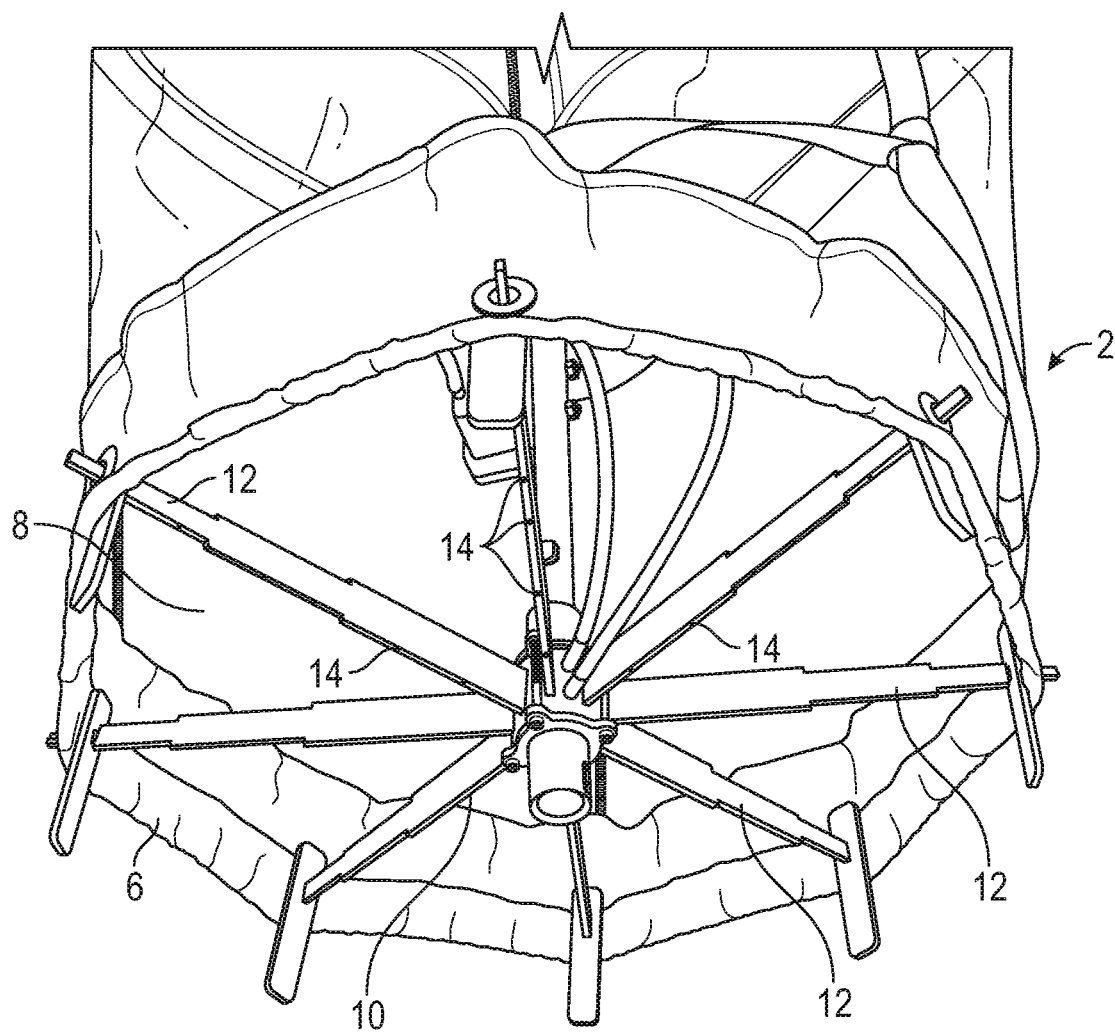
FIG. 2 is a bottom perspective view of a bottom portion of an airflow capture hood.

Referring to FIG. 2, a bottom perspective view of a bottom portion of an airflow capture hood is illustrated. The bottom portion 6 forms an opening 8 at the bottom portion of the hood 2. In various implementations, the majority of opening 8 is open space and allows for air to exit and enter the hood substantially uninhibited. In a particular implementation, the opening 8 has a surface area of substantially 1.7 square feet. In other implementations, the opening may be larger or smaller than this, depending on the overall dimensions of the hood. With an opening having substantially 1.7 square feet of surface area, the airflow capture hood may be capable of accurately measuring high amounts of airflow, even airflow between 200-3000 cubic feet per minute (CFM). In other implementations, depending on the size of the hood, the hood may be capable of measuring airflows of more than 3000 CFM or less than 200 CFM. Larger hoods, though more cumbersome and heavy, are able to measure greater amounts of airflow while smaller and lighter hoods are able to measure lesser amounts of airflow.

The hood 2 includes a grid 10 coupled to the bottom portion 6 of the hood and spanning across the opening 8 of the hood. The grid 10 includes a plurality of ribs 12. The plurality of ribs 12 contain a plurality of holes 14 in the ribs. In various implementations, each rib contains multiple holes; however, in other implementations a rib may contain a single hole or no hole (if the rib is purely structural and not part of the grid sensing apparatus). As air enters the plurality of holes 14 within the grid 10, an airflow can be measured by sensors coupled to the grid. While the grid 10 illustrated in FIG. 2 is circular and includes a plurality of spoked ribs, the airflow capture hood flow control systems may include hoods with grids of any size and pattern. In various implementations, the grid is configured to be substantially the same shape as the perimeter of the bottom portion of the hood, such as a circle, rectangle, or rounded rectangle. The grid 10 may include any number of ribs and the ribs may be in varying patterns. In various implementations, the grid may include ribs that form a grid in a spoked pattern. In other implementations, the grid may include ribs that are branched. In such implementations, the ribs may be spoked as well as branched, forming a grid with a branched spoked pattern. In a particular implementation, the grid includes four ribs, all of which branch into three directions near an end of each rib. In other implementations, the grid may include a first plurality of ribs parallel to one another and a second plurality of ribs parallel to one another but perpendicular to the first plurality of ribs.

Figure 3:
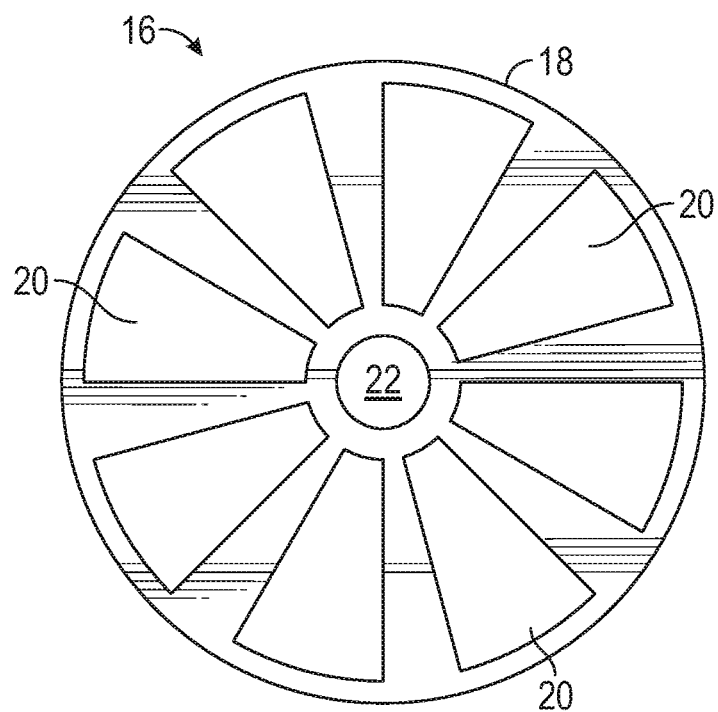
FIG. 3 is a bottom view of a first plate.

The airflow capture hood flow control systems disclosed herein include a plate. Referring to FIG. 3, a bottom view of a first plate 16 is illustrated. The plate is configured to couple to a hood and increase the velocity of the airflow through the hood when the hood is placed over a diffuser of an HVAC system, thus making it easier to measure low amounts of airflow passing through a grid. The plate 16 allows a single hood to address various flow ranges. As the plate guides airflow through the hood, it allows for lower amounts of airflow to be measured as by causing an increase in air velocity across the plurality of ribs of the grid. In a particular implementation, a hood without a plate coupled to the hood may be configured to measure volumes of airflow between 200-3000 CFM. Such a hood may have a base with a diameter of substantially 18 inches and may have an opening with an area of substantially 1.7 feet. Oftentimes, the grid has a lower velocity limit which limits the amount of air that can be measured. In one implementation, the grid may have a lower velocity limit of 80 feet per minute (FPM). Therefore, a hood with an opening of 1.7 square feet would mean that the hood would be able to measure a lower limit of airflow equal to 136 CFM (1.7×80=136). With a plate 16 coupled to the hood, the hood may now be able to measure volumes of airflow between 70-700 CFM as the plate reduces the area of the opening at the base of the hood. In this manner, the addition of the plate to the hood increases the range of airflow that the hood can measure without changing the physical dimensions of the hood itself. For example, by adding a plate that restricts the area that air can pass through the plate to 1.0 square feet, a grid with a lower velocity limit of 80 FPM would be able to measure airflows as low as 80 CFM (1.0×80=80). If a plate was added that restricted the area that air can pass through the plate to 0.4 square feet, the grid would be able to measure airflows as low as 32 CFM (0.4×80=32). By adding a plate to the hood, not just the minimum, but also the maximum, amount of airflow that can be measured can be reduced, particularly in situations involving multiple return grilles, because a back-pressure effect caused by the hood will cause the duct system to divert the air to a different grille when the resistance at a particular grille gets too high.

The plate 16 may be made from various rigid materials including, by non-limiting example, metal, plastic, and carbon fiber. The plate may be about 0.06 inches thick. In other implementations, the plate may be more or less thick than this. In other implementations, the plate may be made from a pliable material, such as, by non-limiting example, nylon or vinyl. In such implementations, the pliable plate may be stretched tight over the end surface of the hood in order to restrict airflow through the hood. The outer perimeter 18 of the plate 16 may form, by non-limiting example, a circle, a rectangle, a rounded rectangle, or any other closed geometrical shape. The shape of the outer perimeter of the plate substantially corresponds to the position of the opening of the bottom portion of the hood that the plate is to be coupled to. Further, the size of the plate substantially corresponds to the size of the opening of the bottom portion of the hood that the plate is to be coupled to. In a particular implementation with a circular plate, the plate is substantially 18 inches in diameter. In other implementations with circular plates, the diameter of the plate may be more or less than this depending on the size of the bottom portion of the hood.

The plate 16 includes a plurality of openings 20 therethrough. The openings may be formed in the plate using a laser cutting technique, water jet cutting, or any other cutting technique compatible with the material from which the plate is made. The plate may include any number of openings and the openings may be various sizes which act to guide the airflow around the ribs to permit a measurement of a predetermined range of airflow to flow through the openings when the hood is placed over a diffuser of an HVAC system. In a particular implementation, the plate may have openings with adjustable sizes. Such an implementation may include two plates rotatably coupled to one another in the same plane where both plates may have similar or different openings therethrough. A first plate could rotate with respect to the second plate and thereby adjust the size of the combined opening through the two plates coupled together. In such an implementation, the range of possible measurements of airflow measured by a hood may be further increased beyond what it would be with a plate having openings that are not variably sized.

The plurality of openings 20 may be a variety of shapes that correspond to the shape of the grid in a way that the grid portions are exposed when the plate is placed over the grid. In implementations where the grid forms a spoked pattern or a branched spoked pattern, the plate coupled to the grid respectively has openings that form a spoked pattern or a branched spoked pattern. Further, in some implementations, the plate 16 may include a hole 22 in the center of the plate used to couple over a central hub of a hood. In a particular implementation, the diameter of the hole 22 is substantially 2.0 inches. In other implementations, the hole may be larger or smaller than this. In still other implementations, the plate may not include a hole 22, particularly those hoods where a central hub is not used to support the hood.

In a particular implementation, the openings 20 in the plate 16 may combine to have a surface area of about 1.0 square feet in a circular plate with a diameter of about 18 inches. In such an implementation, the plate may have eight equal openings as illustrated by FIG. 3.

Figure 4:
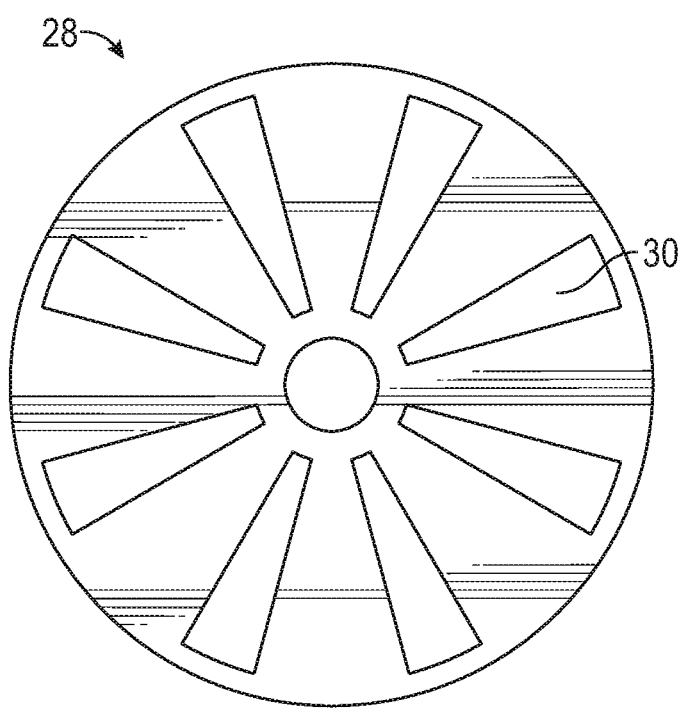
FIG. 4 is a bottom view of second plate.

Referring to FIG. 4, a bottom view of a second plate is illustrated. The second plate 28 may be similar to the first plate illustrated in FIG. 3 with the difference being that the second plate includes smaller openings, or openings with less surface area. In a particular implementation, the plate 28 may include a plurality of openings 30 which have a combined surface area of substantially 0.5 square feet while the plate has a diameter of substantially 18 inches. Such a plate may be able to guide the airflow in the hood so that the range of measurements that can be taken by a hood capable of measuring from about 200-3000 CFM can now be used to measure between about 30-200 CFM. In other implementations, the surface area of the plurality of holes may be any value more than 0.5 square feet and may be any value less than 1.3 square feet. In one specific implementation, the surface area of the holes is 0.45 square feet in a plate with a diameter of substantially 18 inches.

Figure 5:
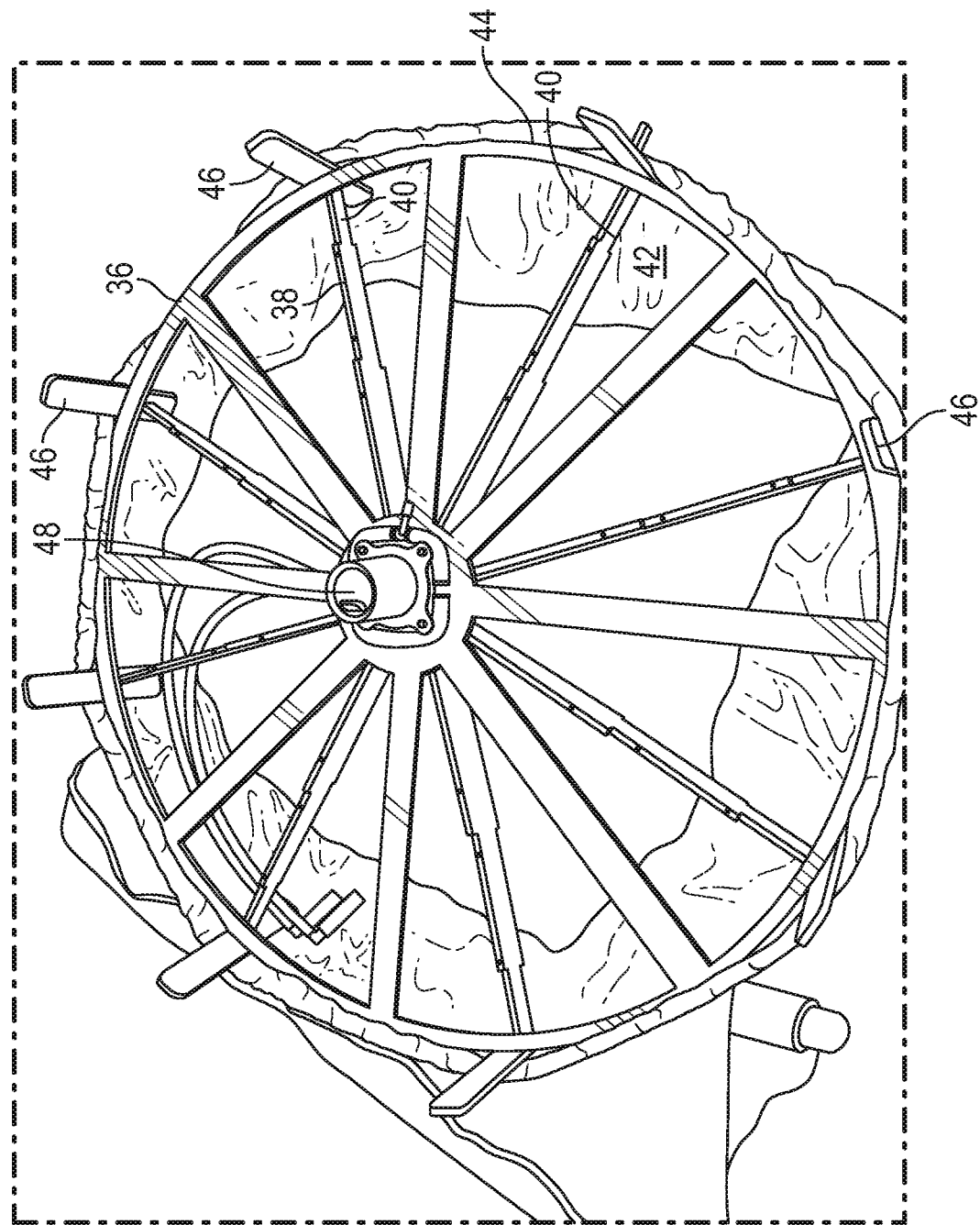
FIG. 5 is a bottom perspective view of a plate coupled to an airflow capture hood.

Referring to FIG. 5, a bottom perspective view of a plate coupled to an airflow capture hood is illustrated. In this illustration, the hood 42 is in a partially collapsed state. The plate 36 may be coupled to the hood and aligned with the grid 38. In various implementations, the plate 36 is coupled over the bottom of the grid 38 as shown in FIG. 5; however, in other implementations the plate 36 may be coupled over the top of the grid 38. The plate 36 is configured to expose the grid 38 and guide airflow past the ribs 40 of the grid 38 when the hood is placed over the diffuser of an HVAC system. The plate 36 may be configured to form a seal between the plate 36 and the edge of the bottom of the hood 42 in order to prevent air from flowing between the plate 36 and the edge of the hood 42 to a degree that the measurements of airflow would not be significantly affected by any air passing between the hood and the plate. In various implementations, the plate 36 may include notches/openings in the outer edge 44 of the plate in order to fit around portions of the hood coupled to the edge of the hood 42, such as a plurality of skirt retainers 46.

Figure 7:
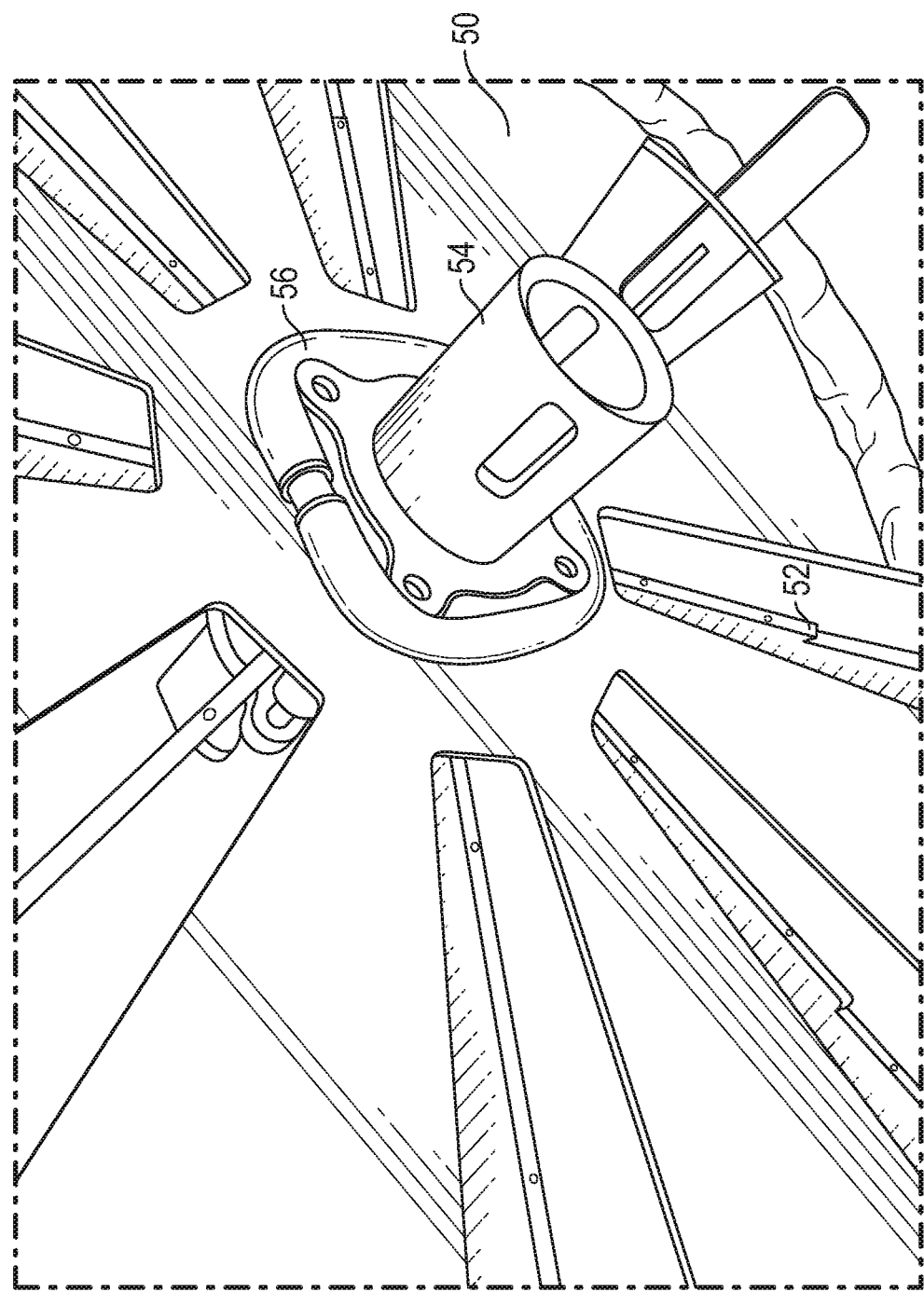
FIG. 7 is a magnified view of a center of a plate coupled to a central hub of an airflow capture hood.

The plate 36 may be coupled to, by non-limiting example, the edges of the hood 42, the center of the grid 38, a central hub 48, the ribs 40, or any combination thereof. The plate 36 is coupled to the hood 42 using, by non-limiting examples, magnets, hook and loop fasteners, clips between the hood and plate, or any other coupling mechanism. Referring to FIG. 7 a magnified view of a center of a plate coupled to a central hub of an airflow capture hood is illustrated. As illustrated in FIG. 7, the plate 50 is coupled to a grid 52. The plate may have a central hole that couples over a central hub 54. The plate may be securely coupled to the central hub through a clamp 56. In various implementations, the clamp 56 may be compressed around the central hub 54 and hold the plate 50 so that it remains coupled to the grid 52. The clamp/ring may be made of rubber tubing and may be coupled to the central hub through the clamp's elastic properties or any other clamping mechanism.

Figure 6:
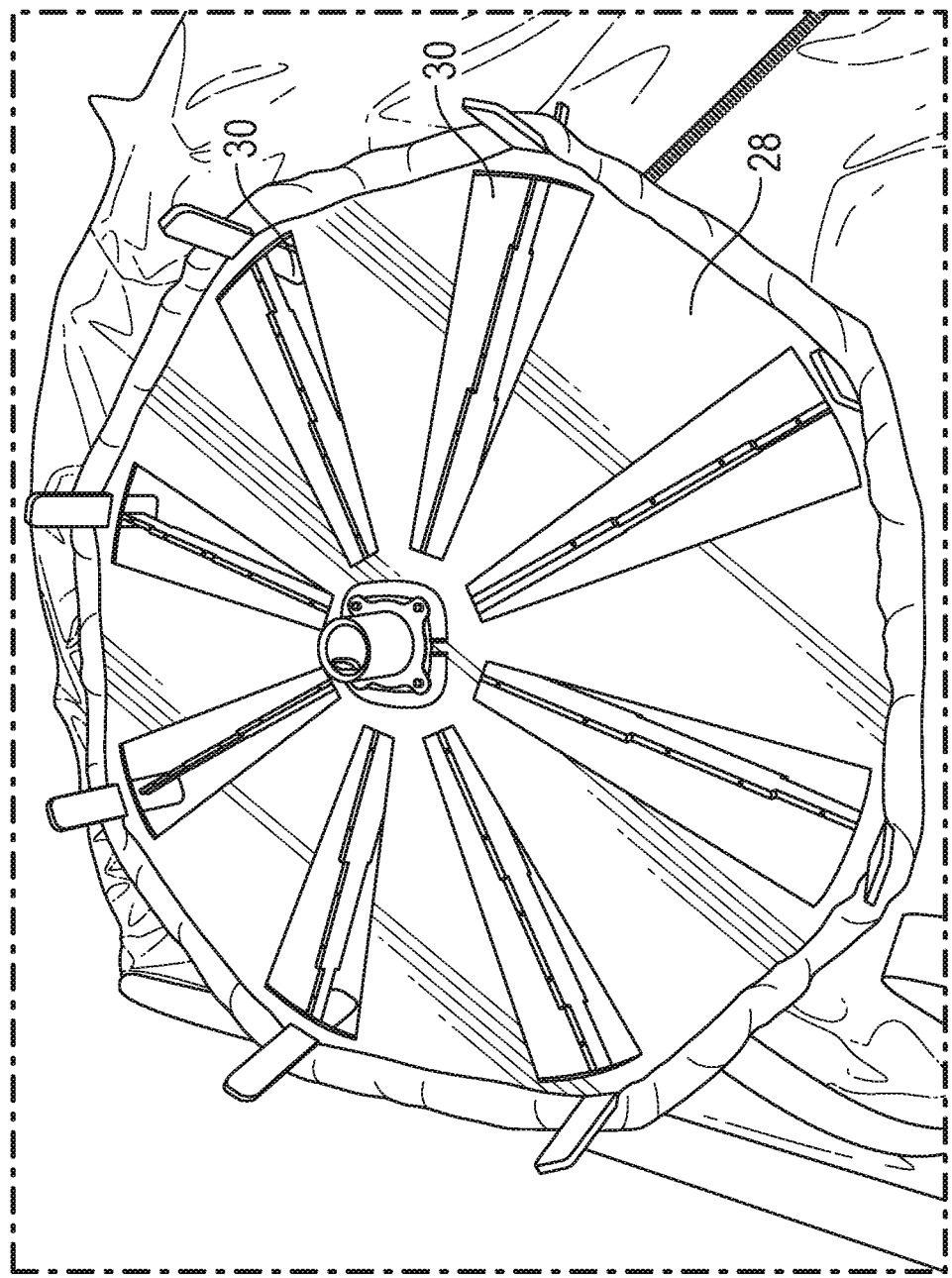
FIG. 6 is a bottom perspective view the second plate coupled to an airflow capture hood.

1 Referring back to FIG. 5, in various implementations, the plate may decrease the area that airflow is able to exit the hood when no plate is coupled to the hood by at least 25%. By reducing the area that airflow is able to exit the hood by at least 25%, a sensor coupled to the hood may now be capable of measuring ranges of airflow as low as about 70 CFM and as high as about 700 CFM. Referring to FIG. 6, a bottom perspective view of the second plate coupled to an airflow capture hood is illustrated. The system illustrated by FIG. 6 is similar to the system illustrated by FIG. 5 with the exception that the plate 28 includes a plurality of holes 30 with less surface area than the holes of the plate of FIG. 5. The plate 28 is configured to decrease an area that airflow exits the hood by at least 50%. In such an implementation, a sensor coupled to the hood may measure ranges of airflow as low as about 30 CFM and as high as about 200 CFM. In other implementations, a plurality of holes in a plate may decrease the area that airflow exits the hood by at least 50% or more or 25% or less. Such implementations may decrease the range of airflow measurements taken by a sensor to as low as 15 CFM.

In various implementations, a method for controlling and calculating the airflow through an airflow capture hood may include determining an approximate range of airflow which may likely be flowing through the hood while testing, adjusting, and balancing the airflow through a diffuser of an HVAC system. The method may include decreasing the size of an opening of the hood if the amount of airflow to be measured is within predetermined ranges regarded as low airflow. In various implementations, any one of below about 700 CFM, below about 200 CFM, and below about 70 CFM may be considered "low". In various implementations, the size of the opening of the hood needs to be decreased if the range of airflow to be measured is low enough so that the hood with the airflow passing through it would not result in an accurate measure of airflow. In the event that the size of the opening needs to be decreased, the method includes coupling a plate with openings therethrough to a grid of the hood. The plate is coupled to the grid in a configuration that allows for the grid to be exposed through the openings of the plate. The plate may be coupled above or below the grid. The size of the openings correlates to the volume of airflow that is to be measured, with smaller openings corresponding to smaller volumes of airflow to be measured. The method includes guiding the airflow entering the hood across the grid using the openings in the plate. The method includes measuring the airflow using a sensor coupled to the grid, and calculating the airflow based on the measurement from the sensor coupled with information on the dimensions of the plate used to decrease the area that airflow can exit the hood.

In various implementations, the method includes coupling the plate below the grid, or to a side of the grid opposite the side of the grid that faces the diffuser. Coupling a plate to this side of the grid does not require disassembly of the hood, as is often the case when the plate is placed above the grid, or on the same side of the grid that faces the diffuser. Disassembly of the hood to attach a plate can prove time consuming and a nuisance. Further, coupling the hood to the bottom of the grid may enable different sized plates to be quickly interchanged with the hood when using the hood.

In places where the description above refers to particular implementations of airflow capture hood flow control systems and implementing components, sub-components, methods and sub-methods, it should be readily apparent that a number of modifications may be made without departing from the spirit thereof and that these implementations, implementing components, sub-components, methods and sub-methods may be applied to other airflow capture hood flow control systems.

What is claimed is:

1. An airflow capture hood system comprising:
a hood comprising a pliable skirt coupled around a grid; and
a plate coupled to the hood and aligned with the grid, the plate comprising a plurality of openings configured to expose the grid to airflow through the hood when the hood is placed over a diffuser of an HVAC system;
wherein the plate is coupled to the hood at a side of the grid opposite a side of the grid facing the diffuser;
wherein a bottom portion of the hood secures an outer perimeter of the plate through contact between the bottom portion of the hood and the outer perimeter of the plate; and
wherein the bottom portion of the hood is pliable.

2. The airflow capture hood system of claim 1, wherein the grid comprises a spoked pattern.

3. The airflow capture hood system of claim 1, wherein the plate is configured to decrease an area through which airflow exits the hood by at least 25%.

4. The airflow capture hood system of claim 1, wherein the plate is configured to decrease an area through which airflow exits the hood by at least 50%.

5. The airflow capture hood system of claim 1, wherein the hood further comprises a central hub, wherein the plate is configured to fit over the central hub.

6. An airflow capture hood system comprising:
a hood comprising a grid and a pliable skirt, the pliable skirt coupled around the grid; and
a plate coupled within a circumference of the pliable skirt and aligned with the grid, the plate comprising a plurality of openings therethrough located symmetrically about a center of the plate;
wherein the plurality of openings are sized to allow a measurement of a predetermined range of airflow to flow through the openings when the hood is placed over a diffuser of an HVAC system; and
wherein the plate is secured to the hood through contact between a bottom portion of the hood and an outer perimeter of the plate.

7. The airflow capture hood system of claim 6, wherein the measurement is 70-700 cubic feet per minute.

8. The airflow capture hood system of claim 6, wherein the measurement is 30-200 cubic feet per minute.

9. The airflow capture hood system of claim 6, wherein the grid comprises a spoked pattern.

10. The airflow capture hood system of claim 6, wherein an outer perimeter of the plate is one of a circle, a rectangle, and a rounded rectangle.

* * * * *